(12) United States Patent
Hamrelius et al.

(10) Patent No.: US 9,191,583 B2
(45) Date of Patent: *Nov. 17, 2015

(54) METHOD FOR DISPLAYING A THERMAL IMAGE IN AN IR CAMERA, AND AN IR CAMERA

(71) Applicants: Torbjörn Hamrelius, Sollentuna (SE); Mats Ahlström, Sollentuna (SE)

(72) Inventors: Torbjörn Hamrelius, Sollentuna (SE); Mats Ahlström, Sollentuna (SE)

(73) Assignee: FLIR Systems AB, Taby (SE)

( * ) Notice: Subject to any disclaimer, the term of this patent is extended or adjusted under 35 U.S.C. 154(b) by 332 days.

This patent is subject to a terminal disclaimer.

(21) Appl. No.: 13/652,291

(22) Filed: Oct. 15, 2012

(65) Prior Publication Data
US 2013/0088604 A1 Apr. 11, 2013

Related U.S. Application Data (63) Continuation-in-part of application No. 11/549,667, filed on Oct. 16, 2006, now Pat. No. 8,289,372.

(51) Int. Cl.
| | |
|---|---|
| H04N 9/43 | (2006.01) |
| H04N 5/33 | (2006.01) |
| G01J 5/10 | (2006.01) |
| G01J 5/00 | (2006.01) |

(52) U.S. Cl.
CPC ... *H04N 5/33* (2013.01); *G01J 5/10* (2013.01); *G01J 2005/0077* (2013.01); *G01J 2005/0081* (2013.01)

(58) Field of Classification Search
None
See application file for complete search history.

(56) References Cited

U.S. PATENT DOCUMENTS

| | | |
|---|---|---|
| 4,020,344 A | 4/1977 | Kerschbaum |
| 4,236,403 A | 12/1980 | Poppendiek |
| 4,555,764 A | 11/1985 | Kuehn |
| 4,647,220 A | 3/1987 | Adams et al. |
| 4,647,221 A | 3/1987 | Szabo |
| 4,999,614 A | 3/1991 | Ueda et al. |
| 5,115,967 A | 5/1992 | Wedekind |
| 5,396,068 A | 3/1995 | Bethea |

(Continued)

OTHER PUBLICATIONS

ANSI/ASHRAE 101-1981, "Application of Infrared Sensing Devices to the Assessment of Building Heat Loss Characteristics", The American Society of Heating, Refrigerating, and Air-Conditioning Engineers, Inc., pp. 33.

(Continued)

*Primary Examiner* — Frederick Bailey
(74) *Attorney, Agent, or Firm* — Haynes and Boone, LLP (57) ABSTRACT

A method for displaying a thermal image in an infrared (IR) thermal camera, includes, for an embodiment, registering an outdoor temperature value, registering an indoor temperature value, calculating an isotherm level by using the registered temperature values and a temperature color alarm level, imaging a surface area to create an image of the temperature distribution in at least a part of the surface area, comparing the surface area temperature in at least one image point of the thermal image to the isotherm level, adjusting the color of the at least one image point in dependence of the relation between the surface area temperature in said at least one image point and the isotherm level and displaying the colored version of the thermal image. The method may allow a user to determine immediately, on-site, if a building is well insulated and may present an easily interpreted and understandable thermal image.

20 Claims, 6 Drawing Sheets

(56) References Cited

U.S. PATENT DOCUMENTS

| | | | |
|---|---|---|---|
| 5,877,688 | A | 3/1999 | Morinaka et al. |
| 6,840,667 | B2 | 1/2005 | Schlagheck et al. |
| 7,034,300 | B2 | 4/2006 | Hamrelius et al. |
| 7,220,966 | B2 | 5/2007 | Saito et al. |
| 7,340,162 | B2 * | 3/2008 | Terre et al. ............. 396/275 |
| 7,513,964 | B2 | 4/2009 | Ritter et al. |
| 7,528,372 | B2 | 5/2009 | Garvey, III et al. |
| 7,748,197 | B2 | 7/2010 | Romes et al. |
| 7,851,758 | B1 | 12/2010 | Scanlon et al. |
| 8,186,873 | B1 | 5/2012 | Madding |
| 2002/0116239 | A1 | 8/2002 | Reinsma et al. |
| 2003/0123518 | A1 | 7/2003 | Abbasi et al. |
| 2004/0245467 | A1 * | 12/2004 | Lannestedt ............. 250/330 |
| 2007/0076920 | A1 * | 4/2007 | Ofek ....................... 382/113 |
| 2007/0076944 | A1 * | 4/2007 | Bryll et al. ............. 382/152 |
| 2009/0302219 | A1 | 12/2009 | Johnson et al. |
| 2009/0304042 | A1 | 12/2009 | Agronin |

OTHER PUBLICATIONS

D.W.J. Hamoen, "New low-cost residential energy audit technique", Thermal Energy Devices, SPIE vol. 313 Thermosense IV, 1981, pp. 35-44.

Flanders et al., "Interpolating R-values from thermograms", U.S. Army Cold Regions Research and Engineering Laboratory, SPIE vol. 313 Thermosense IV, 1981, pp. 157-164.

ASTM International, "Standard Practice for Determining Thermal Resistance of Building Envelope Components from the In-Situ Data", ASTM International, Designation: C 1155-95, May 2007, pp. 8.

ASTM International, "Standard Practice for In-Situ Measurement of Heat Flux and Temperature on Building Envelope Components", ASTM International, Designation: C 1046-95, May 2007, pp. 9.

Wikipedia, the free encyclopedia, "R-value (insulation)", http://en.wikipedia.org/wiki/R-value_(insulation), Sep. 11, 2008, pp. 6.

Wikipedia, the free encyclopedia, "Thermodynamic equilibrium", http://en.wikipedia.org/wiki/Thermal_equilibrium, Oct. 8, 2008, pp. 3.

ISO, "Thermal insulation—Building elements—In-situ measurement of thermal resistance and thermal transmittance—Part 2: Infrared method", ISO/TC 163/SC 1 N 000, May 30, 2008, pp. 31.

* cited by examiner

METHOD FOR DISPLAYING A THERMAL IMAGE IN AN IR CAMERA, AND AN IR CAMERA

CROSS-REFERENCE TO RELATED APPLICATIONS

This continuation-in-part patent application claims priority to and the benefit of U.S. patent application Ser. No. 11/549,667 filed Oct. 16, 2006, which is incorporated herein by reference in its entirety.

TECHNICAL FIELD

One or more embodiments of the present invention relate to a method for displaying a surface area temperature using indoor and outdoor temperature measurements in an infrared (IR) thermal camera, and in particular for displaying critical areas when monitoring and inspecting the condition of buildings.

BACKGROUND

IR cameras can be used in a number of different situations, for example, when inspecting buildings or walls looking for areas with missing or bad insulation, structural damages, for example missing reinforcements, cracks in concrete walls, moisture, or water damages.

An infrared (IR) camera is used for capturing, displaying and storing thermal images. In addition to the thermal data of the captured objects other types of information, for example text and/or voice comments, visual images and environmental data, can also be digitally attached to the thermal image.

It is of great interest not only to view the thermal images but also to be able to tell the different temperatures of different objects, or parts of objects, in the thermal image, to analyze and draw the right conclusion from the data, and to take appropriate action.

However, a thermal image represents the temperature of an object or objects and may differ significantly from a visual image. This leads to difficulties in interpreting and identifying the location of objects shown in the infrared image. The difficulties and uncertainties in interpreting the infrared images also slow down the inspections since the operator often has to look closer and from different angles to be really sure that he has identified the right target, in which the thermal anomaly is actually found.

Further, it can also lead to an operator completely missing a thermal anomaly since the thermal anomaly is not clearly defined and could be hard to recognize just by looking at the thermal image.

Therefore, there is a need to have thermal images presented in a way easy to understand and interpret.

SUMMARY

One or more embodiments of the present invention may enable the identification of deficiencies in the thermal transmission properties of a building construction. For example in accordance with an embodiment, a method for displaying a thermal image in an infrared (IR) thermal camera, includes registering an outdoor temperature value, registering an indoor temperature value, calculating an isotherm level by using the registered temperature values and a temperature color alarm level, imaging a surface area to create an image of the temperature distribution in at least a part of the surface area, comparing the surface area temperature in at least one image point of the thermal image to the isotherm level, adjusting the color of the at least one image point in dependence of the relation between the surface area temperature in said at least one image point and the isotherm level and displaying the colored version of the thermal image.

Since the order of the method limitations is not essential to the invention, the limitations may be performed in any suitable order.

In accordance with an embodiment, an infrared (IR) thermal camera includes a focusing unit for focusing incoming IR radiation from an object in the IR camera to generate an image signal corresponding to the incoming IR radiation, to be passed to a signal conditioning unit for signal conditioning, the conditioned image signal output being passed to a color adjusting unit which in dependence of temperature values registered via a temperature input device and a temperature calculating unit, is arranged to display a thermal image via a display. The calculating unit is arranged to calculate, on the basis of at least two registered temperature values and a temperature color alarm level, an isotherm level.

The color adjusting unit is arranged to compare the surface area temperature in at least one image point of the thermal image to the isotherm level, and adjust the color in at least one image point of the thermal image in dependence of the relation between the surface area temperature in said at least one image point and the isotherm level.

An advantage of one or more embodiments is that it allows you to determine immediately, on-site, if a building is well insulated or not. It presents an easily interpreted and understandable thermal image which instantly draws a user's attention to an identified critical area.

In accordance with an embodiment, the method may also have the temperature color alarm level registered in the IR camera manually, as an alternative to being calculated or preset. The infrared (IR) thermal camera preferably comprises a receiving unit for receiving the temperature color alarm level manually. However, this information could, for example, also be calculated automatically by the calculating unit or be provided by a preset value.

Preferably, in accordance with an embodiment, the method may include calculating the thermal transmission coefficients of an object in the thermal image using the registered temperature values. In the IR camera this is preferably done by the calculating unit.

This feature advantageously provides the user with an opportunity to determine whether or not, for example, a wall fulfills the thermal transmission properties guaranteed by a contractor or a supplier.

Preferably, in accordance with an embodiment, the method may further include registering the air humidity level when registering a temperature measurement and compensating for said air humidity level when displaying the thermal image. For this purpose, the infrared (IR) thermal camera preferably includes a humidity input device.

This feature, in accordance with an embodiment, may increase the accuracy of the temperature measurements.

In accordance with an embodiment, the method may further include registering the distance between a captured object and the IR camera as the IR camera captures a thermal image and compensating for said distance when displaying the thermal image. For this purpose, the infrared (IR) thermal camera, in accordance with an embodiment, may include a distance input device.

This feature, in accordance with an embodiment, may further increase the accuracy of the temperature measurements.

In accordance with an embodiment, the method includes registering or measuring the distance between a captured object, or imaged scene, and the IR thermal camera as the IR thermal camera captures a thermal image. The distance information may, for example, be obtained using a distance laser pointer or any other suitable distance measuring device known in the art.

In accordance with one or more different embodiments presented herein, the obtained measurement information may be used to provide a user with additional information relating to the characteristics of any defects or abnormalities present in the imaged scene and detected by the IR camera.

In accordance with one or more embodiments, the distance measuring device may in some embodiments be complemented with software enabling communication with a local device such as a PDA or autoCAD device.

In accordance with an embodiment, the obtained measurement information along with the field of view (FOV) of the IR thermal camera, known from for example design, production, or calibration of the IR thermal camera, is used to calculate to scale information related to the image. In other words, the distance information and FOV is used to calculate quantified information related to the scene. For example, the quantified information may be related to the length, size, or area of parts of the imaged scene.

In accordance with one or more embodiments, the calculated information may be displayed to the user, for example as graphical representations superimposed onto the captured IR images. In an embodiment, the calculated information may be stored in connection with the captured images for later retrieval. Therefore, a user viewing the images at a later time may use the stored information for analysis of the image content.

In accordance with one or more embodiments, the IR thermal camera may further include, is connected to, or is communicatively coupled to a compass device configured to determine the direction from the IR thermal camera to the imaged scene. In accordance with an embodiment, the direction information is stored along with one or more corresponding captured IR images. In accordance with an embodiment, the direction information is used to set a direction parameter in the IR camera, where after the direction parameter may be applied to calculations performed or stored to images captured by the IR thermal camera. In accordance with one or more embodiments, the direction information may be determined once during a measurement session, for instance applicable if the IR thermal camera is fixedly mounted, placed on a stand, or in another way stationary, or it may be updated at certain time intervals, automatically when the compass device provides new direction information or in response to user input related to retrieving new direction information. The user may be enabled to provide input using one or more input devices integrated in, connected to or communicatively coupled to the IR thermal camera.

The determined direction information obtained using the compass device may be used to determine the reliability of the thermal measurements and therefore further improve interpretation of the imaged scene. For example, the direction information may indicate whether an investigated part of a construction seen from the outside of the construction, wherein suspected heat leakage has been determined and possibly visualized by the IR thermal camera, is located in the north side or the south side of the construction. If the part of the construction, as seen from the outside of the construction, is facing the south, it is possible that the sun has warmed up the surface. Therefore, any heat leakage from the inside to the outside may be interpreted as less than it really is due to the impact of the sun. On the other hand, any heat leakage from the outside to the inside of the construction may be interpreted as being a larger leak than it really is, due to the impact of the sun. On the other hand, if the part of the construction, as seen from the outside of the construction, is facing the north, the sun will not have influenced the temperature and the measurements may be considered more reliable. Thus, by adding knowledge of the direction from the IR thermal camera to the imaged scene, factors such as sun radiation may be compensated for. This provides the advantageous effect of further improving the reliability of the measurement results and enabling more correct user interpretation of the imaged scene.

In accordance with one or more embodiments, the direction information may be obtained, automatically or in response to user input, after the length, size, or area of parts of the imaged scene has been determined according to any of the embodiments described herein.

The advantages of the above mentioned features, in accordance with one or more embodiments, make the techniques disclosed herein exceptionally suited for common applications of an IR-camera such as detecting areas susceptible to mold build-up, finding badly insulated areas, supervising new constructions, finding leaks in underground pipes, planning redevelopments and many more.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

In the following one or more embodiments of the invention will be described in more detail, by way of example embodiments and with reference to the appended drawings, in which.

Embodiments of the invention and their advantages are best understood by referring to the detailed description that follows. It should be appreciated that like reference numerals are used to identify like elements illustrated in one or more of the figures.

DETAILED DESCRIPTION

System Architecture and Use Case Embodiments

Figure 1:
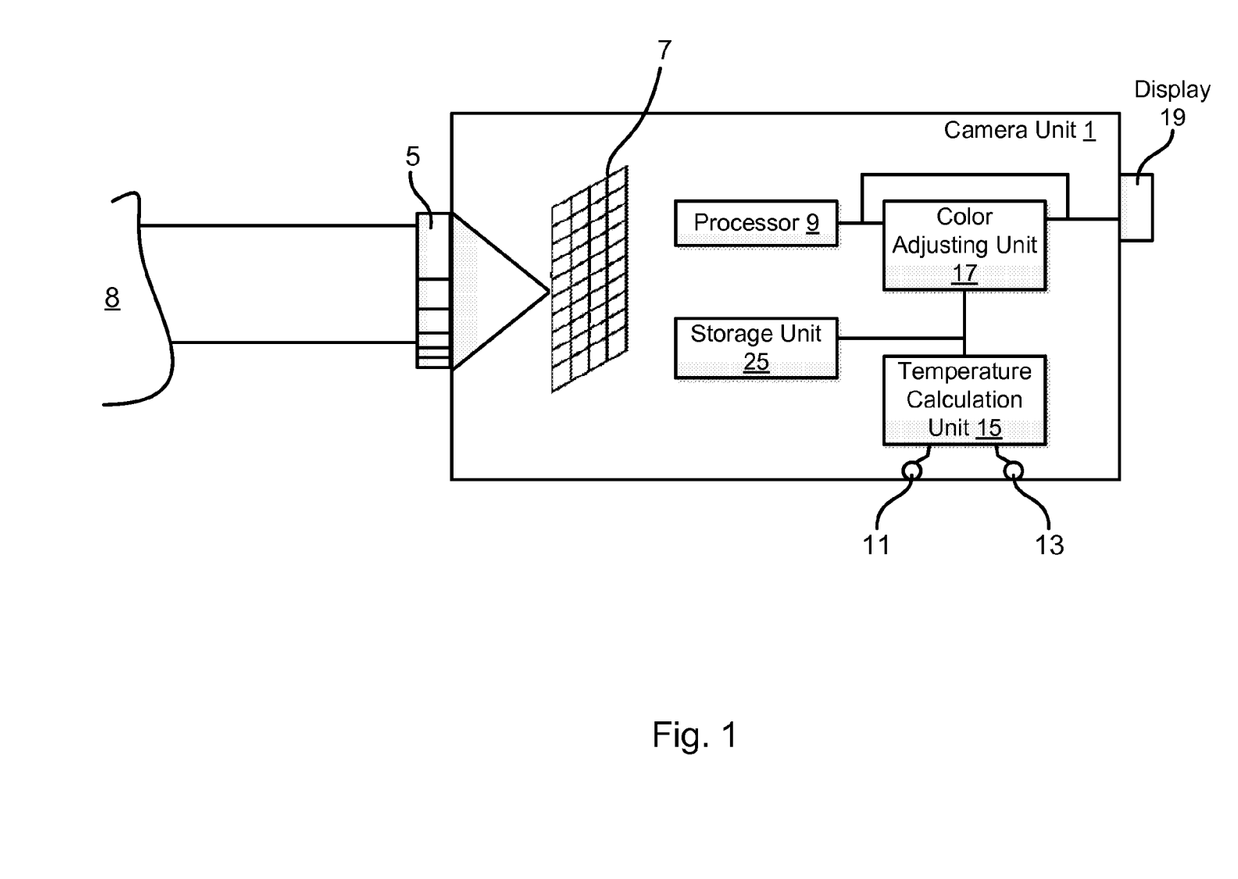
FIG. 1 shows an IR camera in accordance with a first embodiment of the invention.

FIG. 1 shows an IR camera in accordance with an embodiment of the invention. For registering IR images the camera unit 1 comprises the same functions as prior art cameras. The gathering of data and the data processing performed prior to displaying the image are carried out in the conventional way. This technology is known to the skilled person, but will be briefly discussed in the following. The incoming radiation to the camera is focused by at least one lens 5 onto a detector array 7. The detector array is typically a matrix of detector elements, each detecting radiation from a corresponding area on an object 8, e.g. a wall, being imaged. From the detector array the image signal is fed to a signal conditioning unit, or processor, 9 which performs conventional signal conditioning such as corrections for the inherent offset and gain drift.

It should be noted that the IR camera does not necessarily comprise a focal plane array. One or more embodiments of the inventive concept can also be implemented in an IR camera using an IR scanner.

According to one or more embodiments, the IR camera also includes one or more temperature input devices 11 for receiving from a temperature sensor, information about the temperature in the air surrounding the object. The one or more temperature input devices 11 may be adapted for wired or wireless communication with the respective sensors. Alternatively, information about the air temperature may be measured separately and input to the camera in another way, e.g. manually.

The IR camera could further include a humidity input device 13 for receiving, from a humidity sensor, information about the atmospheric humidity in the air surrounding the object 8.

The one or more temperature sensor input devices 11 forwards the air temperature information to a temperature calculation unit 15 arranged to calculate, on the basis of said air temperature information and a temperature color alarm level, a calculated isotherm level, which defines the lowest temperature level the surface area temperature of the object 8 must have in order to be considered acceptable.

The temperature color alarm level could be a preset value, a manually input value or a value registered in some other way known in the art.

From the signal conditioning unit, or processor, 9 the registered image of the object 8 passes to a color adjusting unit 17 arranged to compare the registered temperature in each point of the image of the object 8 to the calculated isotherm level received from the temperature calculation unit 15, and color the image points according to a color scheme defined by a temperature color alarm, depending on if the registered temperature in the image points is below, equal to or above the calculated isotherm level.

The color adjusting unit also displays the image to the viewer in a viewfinder and/or a display 19, in a conventional way. The image, the temperature information, the temperature color alarm level and the isotherm level can also be stored, in the storage unit 25 in the camera or outside the camera in ways common in the art.

In accordance with an embodiment, the IR thermal camera comprises: a lens configured to focus incoming IR radiation from an object, representing a portion of a structure, for the IR camera to generate an image an image signal corresponding to the incoming IR radiation; a processor, configured to perform signal conditioning for the image signal, the signal conditioning including corrections for inherent offset an gain to provide a conditioned image signal output; a distance measuring device configured to register the distance between the surface area and the IR thermal camera as the IR thermal camera captures a thermal image; wherein the processor is further configured to receive the registered distance information and determining additional information relating to the characteristics of any defects or abnormalities present on the surface area, dependent on the registered distance information; a color adjusting unit, which in dependence of temperature values registered via one or more temperature input devices and processed by the processor, is configured to display a thermal image via a display; wherein the processor is configured to calculate, on the basis of at least a first registered air temperature value (TA) for outside the structure, a second registered air temperature value ($T_B$) for inside the structure, a temperature color alarm level ($T_{CAL}$), and a temperature level value ($T_{ISO}$); and wherein the color adjusting unit is configured to compare the surface area temperature in at least one image point of the thermal image to the temperature level value ($T_{ISO}$), and adjust the color in at least one image point of the thermal image in dependence of the relation between the surface area temperature in the at least one image point and the temperature level value ($T_{ISO}$), and in dependence of any determined additional information, to create a colored version of the thermal image.

In accordance with an embodiment, the processor is further configured to retrieve the field of view (FOV) of the IR thermal camera and calculate to scale information related to the image, based on the retrieved FOV and the obtained distance information. The calculated to scale information may be related to the length, size, or area of parts of the surface area. The additional information may in accordance with an embodiment include the registered distance information and/or the FOV of the IR thermal camera.

In accordance with an embodiment, the processor is configured to superimpose the calculated to scale information onto a captured IR image.

In accordance with an embodiment, the storage unit (25) is configured to store the calculated to scale information in connection with a captured image.

In accordance with an embodiment, the infrared (IR) thermal camera further comprises a direction determination unit configured to determine the direction from the IR thermal camera to the surface area, or imaged scene. The direction determination unit may for example be a compass. In accordance with an embodiment, the processor is further configured to compensate for the determined direction when determining said isotherm level ($T_{ISO}$) and said additional information.

Figure 2A:
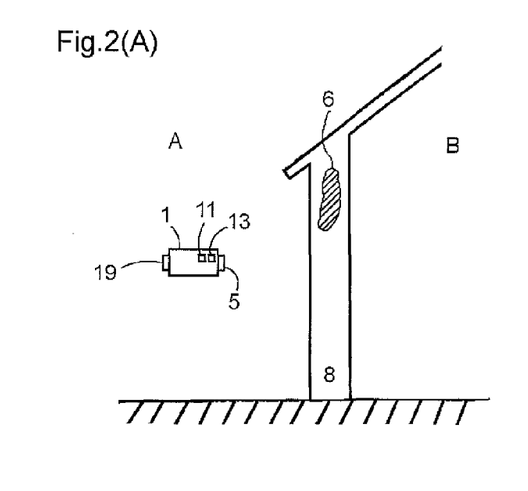
FIG. 2(A) shows a cross-section of a house wall and an IR camera in accordance with an embodiment of the invention located on the outside.
Figure 2B:
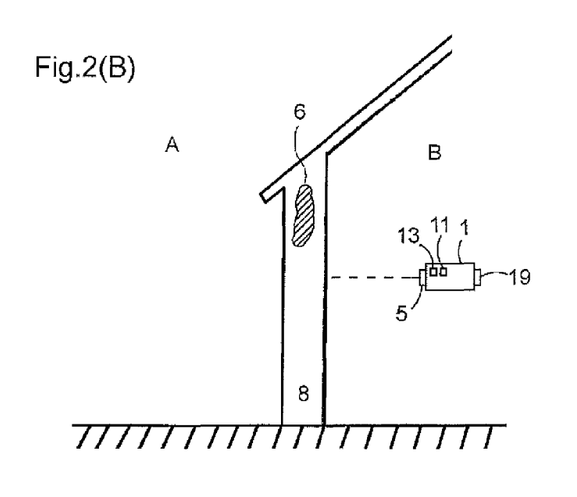
FIG. 2(B) shows a cross-section of a house wall and an IR camera in accordance with an embodiment of the invention located on the inside.
Figure 2C:
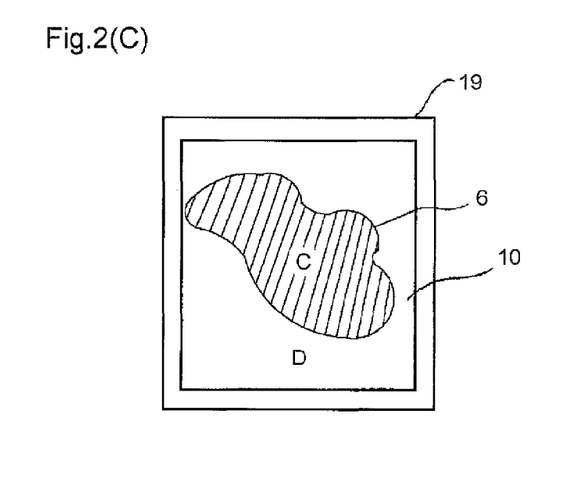
FIG. 2(C) shows an IR camera display illustrating the temperature color alarm in accordance with an embodiment of the invention.

FIGS. 2(A), 2(B) and 2(C) illustrate how one or more embodiments of the present invention are used to detect a fault 6 in a house wall 8 and alert a user by presenting a thermal image 10, which includes a temperature color alarm, on the display 19.

In FIG. 2(A), an IR camera 1, in accordance with an embodiment of the invention, is located on the outside A of a house wall 8, separating the inside B from the outside A of the house. In the house wall 8 there is a deficiency 6. This deficiency 6 could be caused by any number of reasons, for example, poor wall insulation, poor insulation material, poor wall material, a faulty construction, water damage or leakage etc. Deficiencies as the one above cause heat leakage from the inside B to the outside A, or from the outside A to the inside B of the house and thus provide the construction with insufficient insulation.

When the IR camera 1 is located on the outside A of the house, as in FIG. 2(A), a user of the IR camera 1 can manually select for the temperature input device 11 to register an outdoor temperature value, $T_A$.

After having registered an outdoor temperature value, a user can go into the house, as illustrated in FIG. 2(B), and there manually select for the temperature input device 11 to register an indoor temperature value $T_B$, or the indoor temperature value $T_B$ could be automatically registered by the temperature input device 11 as the IR camera 1 starts imaging.

The opposite registering procedure is of course equally applicable, that is, first registering an indoor temperature value $T_B$ on the inside of the house and then go outside to register an outdoor temperature value, $T_A$, when imaging from the outside. The registered outdoor temperature value, $T_A$, and indoor temperature value, $T_B$, can be stored in the storage unit 25 in the IR camera 1, as shown in FIG. 1, or outside the camera in ways common in the art. A user can also, of course, register the temperature values manually by inputting temperature values measured separately outside of the IR camera.

In addition to the registered and stored outdoor, $T_A$, and indoor, $T_B$, temperature values, the user can, for example, manually input a temperature color alarm level, $T_{CAL}$, defining an accepted percentage of the maximum amount of heat transfer from the inside B of the wall 8 to the outside A of the wall 8, or from the outside A of the wall 8 to the inside B of the wall 8.

The information about the air temperatures, that is, the registered outdoor and indoor temperatures ($T_A$, $T_B$) and the temperature color alarm level ($T_{CAL}$), is forwarded to a temperature calculation unit 15 arranged to calculate, on the basis of the air temperature information, an isotherm level, $T_{ISO}$. The isotherm level $T_{ISO}$ is a threshold temperature value, wherein, in a first mode, normal temperature values are temperature values above the threshold temperature level value $T_{ISO}$ and abnormal temperature values are temperature values below the threshold temperature level value $T_{ISO}$ and, in a second mode, normal temperature values are temperature values below the threshold temperature level value $T_{ISO}$ and abnormal temperature values are temperature values above the threshold temperature level value $T_{ISO}$.

In accordance with an embodiment, the isotherm level, $T_{ISO}$, is determined according to the following formula:

$$T_{ISO} = T_B - \left(\frac{(100 - T_{CAL})}{100}\right) \times (T_B - T_A)$$

According to the first formula, if the measurement of the imaged object 8, or the surface area temperature, as described below, is performed from the inside of the construction and $T_B > T_A$, then $T_{ISO}$ defines the lowest accepted surface temperature of the imaged object or area 8. If the measurement of the imaged object 8, or the surface area temperature, is performed from the inside of the construction and $T_B < T_A$, then $T_{ISO}$ defines the highest accepted surface temperature of the imaged object or area 8.

In accordance with another embodiment, the isotherm level, $T_{ISO}$, is determined according to the following formula:

$$T_{ISO} = T_A - \left(\frac{(100 - T_{CAL})}{100}\right) \times (T_A - T_B)$$

According to the second formula above, if the measurement of the imaged object 8, or the surface area temperature, is performed from the outside of the construction and $T_B > T_A$, then $T_{ISO}$ defines the highest accepted surface temperature of the imaged object or area 8. If the measurement of the imaged object 8, or the surface area temperature, is performed from the outside of the construction and $T_B < T_A$, then $T_{ISO}$ defines the lowest accepted surface temperature of the imaged object or area 8.

As the lens 5 of the IR camera 1 is directed towards the wall 8 and starts imaging, as illustrated in FIG. 2(B), the color adjusting unit 17 is arranged to compare the surface area temperature in each point of the image of the wall 8 to the isotherm level, $T_{ISO}$, received from the temperature calculation unit 15.

The color adjusting unit 17 identifies image points in which the surface area temperature is lower than the isotherm level, $T_{ISO}$ and also changes the color of all such points to a particular color according to a color scheme defined by a temperature color alarm. For example, the temperature color alarm could define a color scheme in which all identified points are highlighted by one specific transparent color, e.g. red, green etc., or in which all identified points are colored in dependence of how far below the isotherm level, $T_{ISO}$, the surface area temperature in that point is, e.g. different or brighter/darker colors, or a combination of the two.

In accordance with an embodiment, the temperature color alarm, as can be seen in FIG. 2(C), will cause the color adjusting unit 17 to change the color of the areas in thermal image 10 where the surface area temperature is below the isotherm level, $T_{ISO}$, that is, the area of the deficiency 6, into one particular, transparent color C.

The rest of the image area, that is, the area where the surface area temperature is equal to or above the isotherm level, $T_{ISO}$, the area D in FIG. 2(C), will be changed by the color adjusting unit 17 into grey scale.

Figure 3:
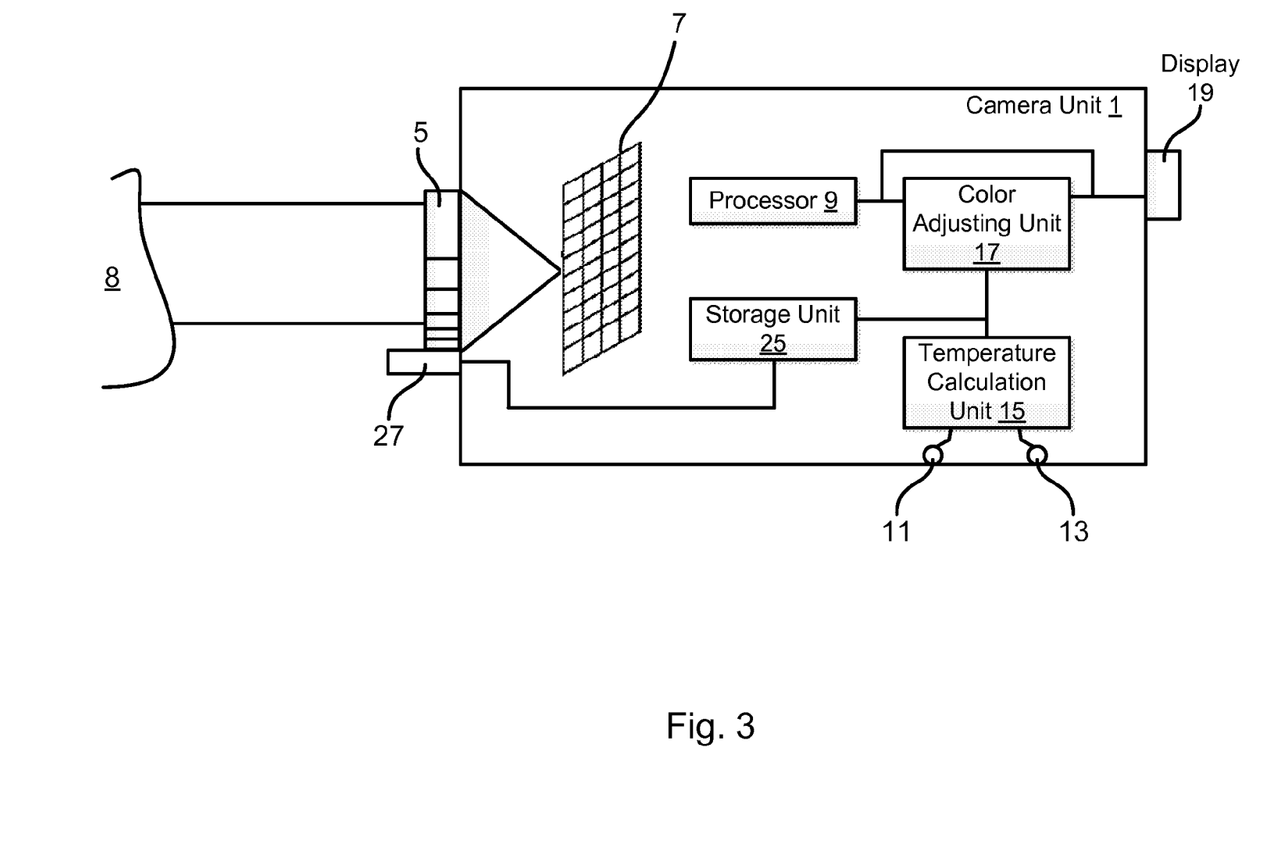
FIG. 3 shows an arrangement in accordance with a second embodiment of the invention.

Of course, the division of the functions performed in units 9, 15 and 17 is merely done to illustrate the functions of the camera. In reality they may be performed in one or two, or more units in the camera 1 or, as depicted in FIG. 3, even outside of the camera 1. Preferably, as indicated in FIG. 1 by a solid line directly from the signal conditioning unit 9 to the viewer, the modification of the image may be bypassed so that a conventional IR image is shown on the display 19 of the IR camera.

There are two additional features preferably present in the IR camera 1 that could increase the accuracy of the measurements and be used when displaying thermal image 10 according to the temperature color alarm. These additional features can be implemented together or independently of each other in the IR camera.

The first additional feature, discussed with reference to FIG. 1, is the humidity input device 13 including a humidity sensor, which could be arranged to measure the atmospheric humidity level and since the humidity can affect temperature measurements, the atmospheric humidity level could be compensated for when displaying the captured thermal image 10 according to the temperature color alarm.

The humidity input device 13 may be adapted for wired or wireless communication with the respective sensors. Alternatively, information about the atmospheric humidity level may be measured separately and input to the camera in another way, e.g. manually. The measured atmospheric humidity level can also be stored in the storage unit 25 in the IR camera 1, as shown in FIG. 1, or outside the camera in ways common in the art.

The second additional feature, in accordance with a second embodiment shown in FIG. 3 in which the reference numerals refers to the same objects as in FIG. 1, is for the IR camera to include one or more distance input devices 27, for example, a laser measuring device, arranged to register and store the distance between the captured object 8 and the IR camera 1, which also could be compensated for when displaying the captured thermal image 10 according to the temperature color alarm. Alternatively, information about the distance between the captured object 8 and the IR camera 1 may be measured separately and input to the camera in another way, e.g. manually.

The measured distance can also be stored in the storage unit 25 in the IR camera 1, as shown in FIG. 1, or outside the camera in ways common in the art.

This second additional feature can of course be implemented in an IR camera also including the previously mentioned feature in order to achieve as accurate measurements as possible.

Figure 4:
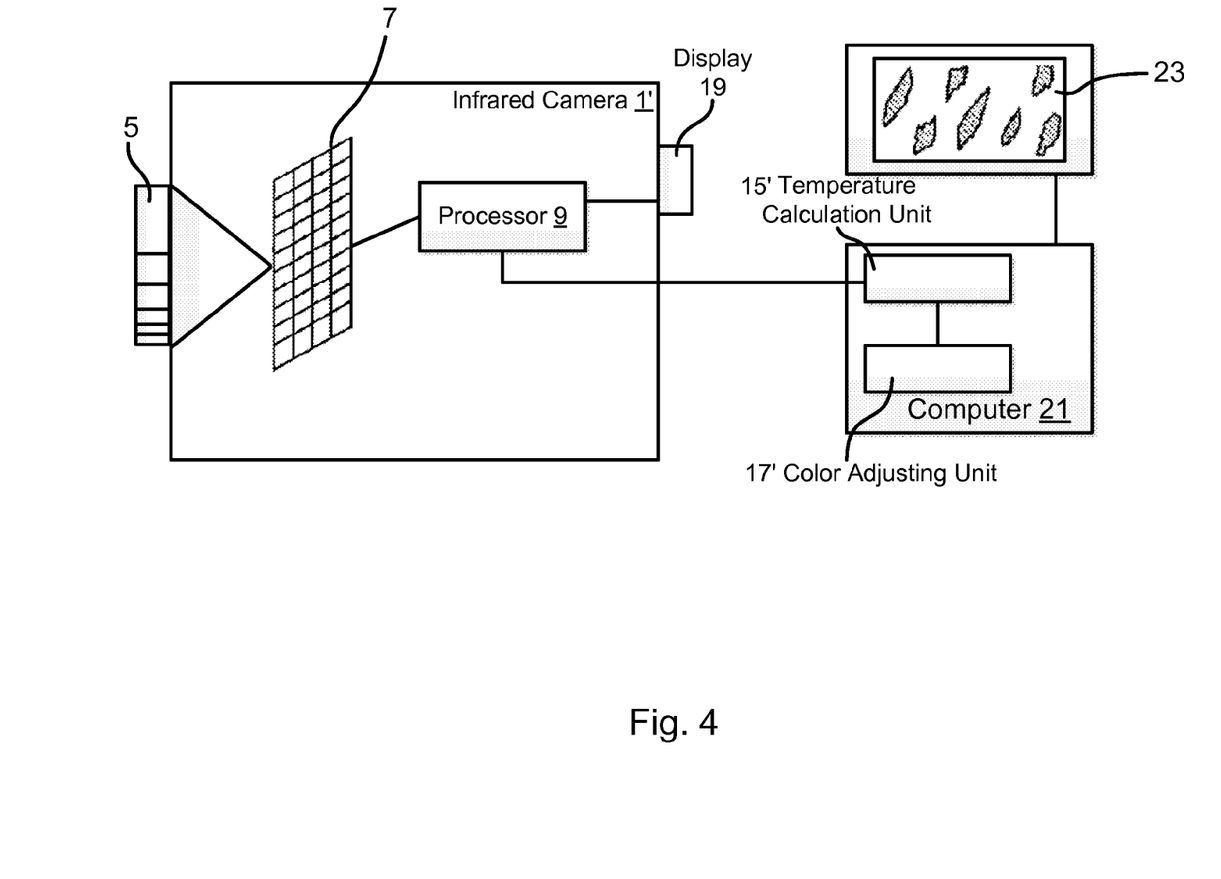
FIG. 4 shows an arrangement in accordance with a third embodiment of the invention.

Alternatively, as depicted in FIG. 4, the camera can be a conventional IR camera 1' as shown in FIG. 1, arranged to output a temperature dependent image of the object 8. As before, incoming IR radiation from the object 8 is focused by a focusing system 5 onto a focal plane array 7 or onto the scanning device, depending on the type of IR camera used. The signal from the focal plane array 7 (or scanning device) is fed to a signal conditioning unit 9. The output image from the signal conditioning unit 9 can then be transferred to a computer 21, as is well known in the art. The information about the air temperature and atmospheric humidity may be registered by sensors and stored in a storage unit (not shown) in the camera or may be entered into the computer manually. The computer then comprises units 15', 17' corresponding to the temperature calculation unit 15 and the color adjusting unit 17 of FIG. 1. The adjusted image, indicating in accordance with a color scheme defined by the temperature color alarm the areas where deficiencies may be present, can then be displayed on the computer screen 23 and also be stored in a storage unit preferably present in the computer.

In accordance with a fourth embodiment, the IR camera 1 could comprise calculating unit further arranged to calculate thermal transmission coefficients using the indoor and outdoor temperature measurements, as described in connection to FIGS. 2(A), 2(B) and 2(C), together with thermal images.

However, this requires that the user inputs additional information manually, for example, information regarding the construction of the wall, what kind of building materials, etc. For example, a static one-dimensional thermal transmission coefficient Q can be calculated using the indoor and outdoor temperature measurements ($T_A$, $T_B$) according to the following formula:

$$Q = \frac{\lambda}{d}(T_A - T_B)$$

where λ is an approximation of the thermal conductivity of a wall and d is the thickness of the wall, both of which have to be manually registered in the IR camera. This simple and general example illustrates how wall properties can be calculated using one or more embodiments of the present invention, but should not be considered limited towards more complex calculations and analyses.

The calculated thermal transmission coefficients can be stored in the storage unit 25 in the IR camera 1 or outside the camera in ways common in the art.

Method, or Procedure, Embodiments

Figure 5:
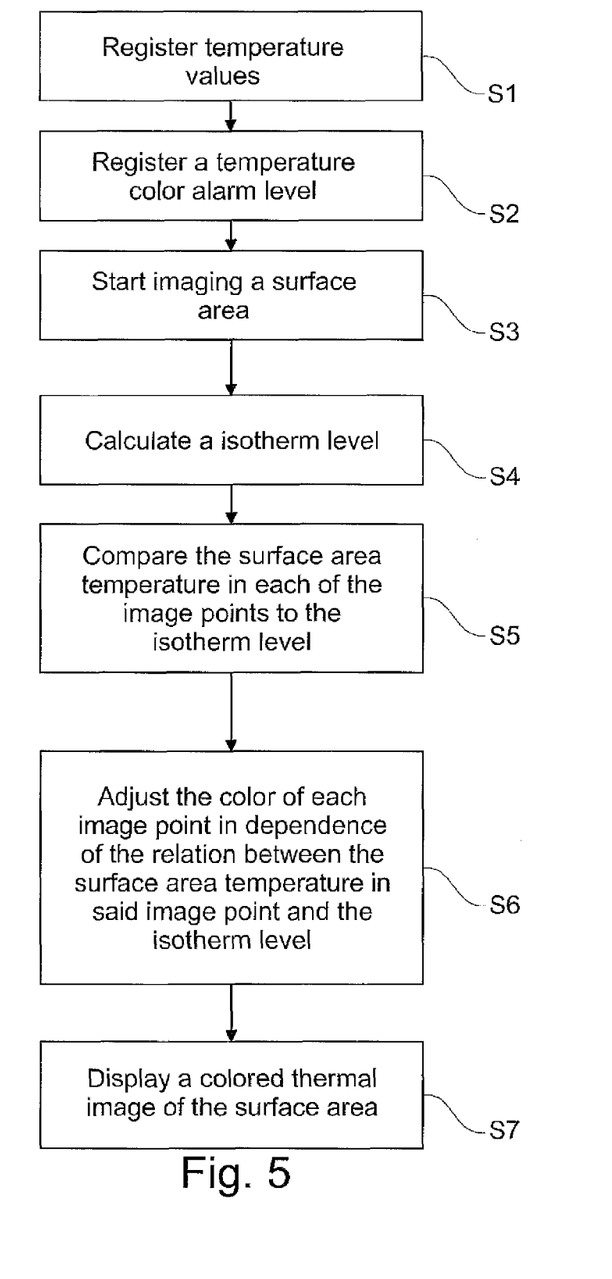
FIG. 5 is a flowchart describing a method, or procedure, in accordance with one or more embodiments of the present invention.

The flowchart in FIG. 5 describes the steps of the procedure in accordance with an embodiment of the present invention.

In step S1, an outdoor temperature value is preferably registered if the imaging is performed on a surface area inside of the house. An indoor temperature value is preferably registered if the imaging is performed on a surface area outside of the house. The temperature value can be registered manually or automatically by using the temperature sensor in the IR camera.

In step S2, a temperature color alarm level is set. The temperature color alarm level can be provided by manually registering a value or by using a preset value.

In step S3, the IR camera starts imaging a surface area.

In step S4, an isotherm level is calculated by using the registered temperature value, the temperature color alarm level and a second temperature value, which is registered automatically by the temperature sensor in the IR camera as it starts imaging. The second temperature value is then either an indoor temperature value if the imaging is performed on a surface area inside of the house or an outdoor temperature value if the imaging is performed on a surface area outside of the house.

Optionally step S4 can be performed prior to step S3, wherein the isotherm level is calculated before the IR camera starts imaging. This can be done by registering the second temperature value either manually or by using the temperature sensor of the IR camera prior to the imaging.

In step S5, the temperature level in each image point is compared to the calculated isotherm level.

In step S6, the color in each image point is adjusted according to a color scheme defined by the temperature color alarm on the basis of the relation between the temperature level in the image point and the isotherm level.

In step S7, the color adjusted thermal image is displayed.

As a result of the temperature color alarm, the thermal image 10 presented by the display 19 when the user scans over the wall will clearly define and highlight the area of the deficiency 6, thereby alerting the user of where the construction is faulty. The temperature color alarm could also be arranged to draw the user's attention by producing an audible alert at the same time.

Figure 6:
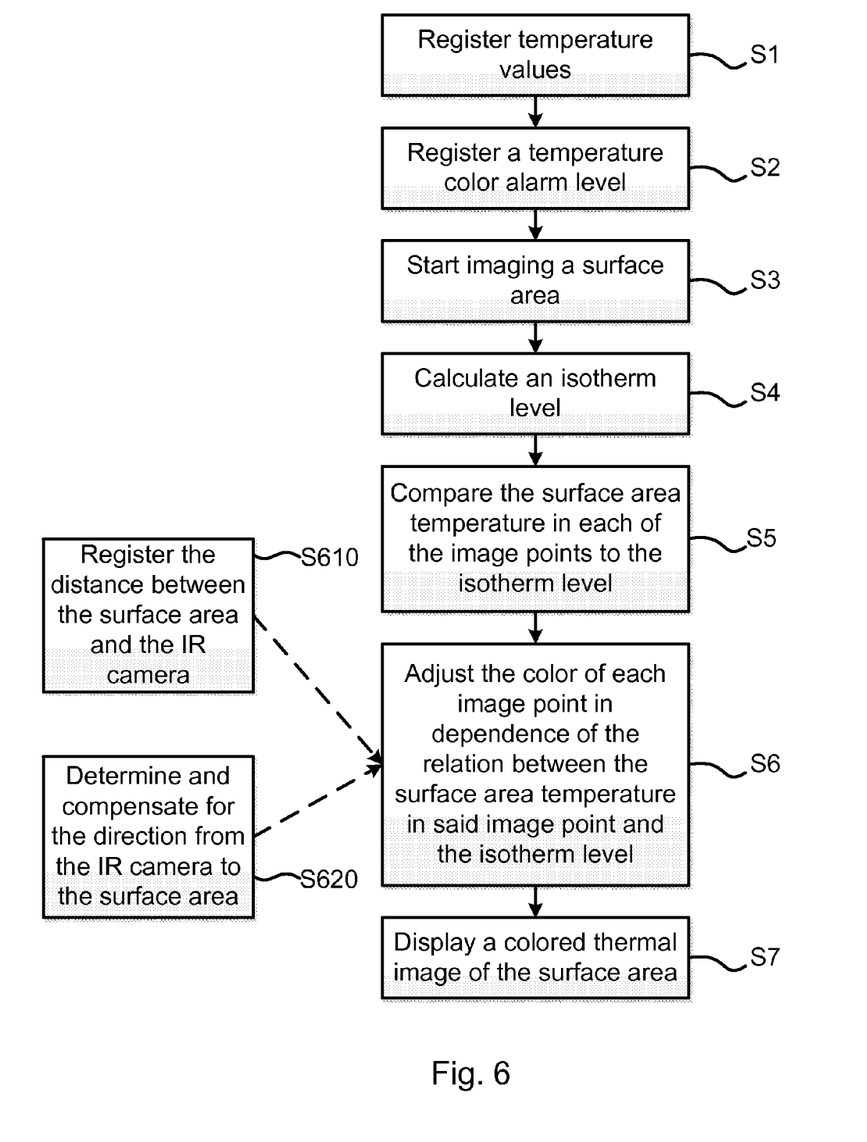
FIG. 6 is a flowchart describing a method, or procedure, in accordance with one or more embodiments of the present invention.

The flowchart in FIG. 6 describes a method, or procedure, in accordance with one or more embodiments of the present invention, wherein steps S1-S7 correspond to the steps of FIG. 5.

As can be seen in FIG. 6, additional input may be provided before adjusting the color of each image in Step 6. In accordance with one or more embodiments described with respect to steps S610 and S620, Step S6 may comprise receiving additional input from steps S610 and/or S620 and adjusting the color of at least one image point also in dependence of the received additional input.

Step S610, in accordance with one or more embodiments of the invention, includes registering or measuring the distance between an investigated surface area, an imaged object, or an imaged scene, and the IR thermal camera as the IR thermal camera captures a thermal image. The distance information may for example be obtained using a distance laser pointer or any other suitable distance measuring device known in the art, as described above for example in connection with FIG. 1.

In accordance with one or more different embodiments presented herein, step S610 further includes determining additional information relating to the characteristics of any defects or abnormalities present on the surface area, or in the imaged scene, and detected by the IR camera, dependent on the registered or measured distance information.

In accordance with one or more embodiments, the distance measuring device may in some embodiments be complemented with software or firmware enabling communication with a local device, such as a mobile processing unit, a PDA or an autoCAD device.

In accordance with an embodiment, the method step S610 further includes retrieving the field of view (FOV) of the IR thermal camera, known from for example design, production, or calibration of the IR thermal camera, and calculate to scale information related to the image, based on the retrieved FOV and the obtained distance information. In other words, the distance information and FOV is used to calculate quantified information related to the scene. For example, the scale information, or quantified information, may be related to the length, size, or area of parts of the imaged scene.

In accordance with one or more embodiments, the calculated to scale information, or quantified information, may be displayed to the user, for example as a graphical representation superimposed onto the captured IR images. In accordance with an embodiment, the calculated to scale information, or quantified information, may be stored in connection with the captured images for later retrieval. Therefore, a user viewing the images at a later time may use the stored information for analysis of the image content.

In accordance with an embodiment, the calculated information is used to provide an X-axis and a Y-axis that may be superimposed onto the captured IR images, for instance in the form of two axes representing a graph having numeric distance units displayed along the axes, as a coordinate system, or as a grid. In accordance with an embodiment, the calculated information may be used to provide a visual representation of a folding rule that is superimposed onto the captured IR images and displayed to the user.

By providing to scale length and position information displayed in the IR, in the form of for example an X-axis and a Y-axis, a coordinate system, or a grid, the extent and/or position of possible defects made visible in the images is easily visible and interpretable to a user viewing the displayed image.

In accordance with an embodiment, the calculated information is used to provide a calculation of the area of a specific part of the image. The specific part of the image may for example be an area within a frame, which may be automatically positioned in a certain part of the image such as for example the center of the image, or positioned by a user manually, for example using an input device integrated in, connected to or communicatively coupled to the IR thermal camera. In accordance with an embodiment, the area of the part of the scene that corresponds to the displayed frame is further shown in the displayed image, in connection with the displayed frame. Therefore, a user receives an indication of the real world size of the marked/framed area. The area of the part of the scene that corresponds to the displayed frame, and position information, may further be stored in connection with one or more corresponding IR images.

In accordance with one or more different embodiments, the frame described above may be rectangular, circular, any other suitable predetermined geometric shape, or a form that is defined by a user using an input device integrated in, connected to or communicatively coupled to the IR thermal camera. For example, the user may be enabled to use touch functionality to generate and/or position a frame or draw a free form on the display of the IR thermal camera. If at least one captured image, and any corresponding calculated information, has been stored and is retrieved for view and analysis at a later time on a remote processing and display device, such as a computer having a computer screen, the user may be enabled to use input functionality of the remote processing device to generate and/or position a frame or draw a free form on the display of the remote processing device.

In a use case example, if a deficiency in the form of a heat leakage from one side of a construction to the other side of the construction has been determined and visualized in the captured IR thermal images in accordance with one or more embodiments presented herein, length or area information in the form of an X-axis and a Y-axis, a coordinate system, a grid, a graphical representation of a folding rule or a framed area may be superimposed on the captured one or more images to enable easier interpretation of the extent of the problem. For instance, the information could be used to determine if the lack of wall insulation, poor quality of insulation material, poor quality of wall material, construction flaw, water damage, leakage or other problem that the heat leakage may indicate is big enough to require immediate action or not, as well as provide a better basis for cost estimates of such actions. Furthermore, length or area information and/or conclusions drawn regarding extent, action plan and/or cost estimate may advantageously be included in an inspection report.

In accordance with one or more embodiments, the method further includes a Step S620, including determining the direction from the IR thermal camera to the surface area, or the imaged scene. The direction information may be determined using a compass device configured to determine the direction from the IR thermal camera to the surface area, or the imaged scene. In accordance with one or more embodiments, the compass device may be integrated in, connected to, or communicatively coupled to the IR thermal camera used for capturing the one or more IR thermal images.

In accordance with one or more embodiments presented herein, the method step S620 includes compensating for the determined direction in temperature measurements performed using the IR thermal camera, before the step of adjusting the color of at least one image point. In accordance with an embodiment, step S620 includes compensating for the determined direction when determining the isotherm level ($T_{ISO}$) and/or the any relevant additional information. Therefore, more accurate temperature information is obtained, and more reliable interpretation of the colored IR thermal image is enabled.

In accordance with an embodiment, the direction information is stored along with one or more corresponding captured IR images. In accordance with an embodiment, the direction information is used to set a direction parameter in the IR camera, where after the direction parameter may be applied to calculations performed, or stored to images captured by the IR thermal camera, thus enabling compensation and rendering more accurate temperature information in images captured and colored using the IR thermal camera, further exemplified below.

In accordance with one or more embodiments, the direction information may be determined once during a measurement session, for instance applicable if the IR thermal camera is fixedly mounted, placed on a stand, or in another way stationary, or it may be updated at certain time intervals, automatically when the compass device provides new direction information or in response to user input related to retrieving new direction information. The user may be enabled to provide input using one or more input devices integrated in, connected to or communicatively coupled to the IR thermal camera.

The determined direction information obtained using the compass device may be used to determine the reliability of the thermal measurements and thus further improve interpretation of the imaged scene. For example, the direction information may indicate whether an investigated part of a construction seen from the outside of the construction, wherein suspected heat leakage has been determined and possibly visualized by the IR thermal camera, is located in the north side or the south side of the construction. If the part of the construction, as seen from the outside of the construction, is facing the south, it is possible that the sun has warmed up the surface. Therefore, any heat leakage from the inside to the outside may be interpreted as less than it really is due to the impact of the sun. On the other hand, any heat leakage from the outside to the inside of the construction may be interpreted as being a larger leak than it really is, due to the impact of the sun. On the other hand, if the part of the construction, as seen from the outside of the construction, is facing the north, the sun will not have influenced the temperature and the measurements may be considered more reliable. Thus, by adding knowledge of the direction from the IR thermal camera to the imaged scene, factors such as sun radiation may be compensated for. This provides the advantageous effect of further improving the reliability of the measurement results and enabling more correct user interpretation of the imaged scene.

In accordance with an embodiment, the direction information may be obtained, automatically or in response to user input, after the length, size, or area of parts of the imaged scene has been determined according to any of the embodiments described herein.

Further Embodiments

In addition to deficiencies in a wall, the IR camera 1 can of course be used to identify any area of a wall 8 where there is some form of heat loss.

As a further example, the temperature color alarm could be used when confirming the expected quality of the work done by a contractor or a product delivered by a supplier, and thus ensuring that the construction is correctly built and up to code.

In accordance with an embodiment, the system is connected to or communicatively coupled to a probe, a meter link, or another type of contact thermometer with the ability of registering or calculating an emissivity value. In accordance with an embodiment, one or more emissivity values are stored to corresponding one or more captured images, thus relating measured or calculated emissivity to the captured images or a part of the images. The emissivity value or values may be used to improve the temperature measurements, in manners known in the art, thus enabling approaching of absolute temperature values in the temperature measurements. In other words, the addition of emissivity values provides calibration of the temperature measurement.

Embodiments described herein may be used to determine or prove construction errors, which may serve as valuable information in legal proceedings.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims

What is claimed is:

1. A method for displaying a thermal image of a scene in an infrared (IR) thermal camera, the method comprising:
registering a first air temperature value ($T_A$);
registering a second air temperature value ($T_B$);
calculating a threshold temperature level value ($T_{Iso}$) based on the registered $T_A$, the registered $T_B$, and a temperature color alarm level ($T_{CAL}$);
imaging, by the IR thermal camera, a surface area to capture the thermal image, wherein the thermal image represents a temperature distribution in at least a part of the surface area;
comparing a surface area temperature in at least one image point of the thermal image to the $T_{ISO}$;
adjusting the color of the at least one image point in dependence of the relation between the surface area temperature in the at least one image point and the $T_{130}$ to create a colored version of the thermal image; and
displaying the colored version of the thermal image.

2. The method of claim 1, wherein:
the scene comprises a partition separating an outside and an inside of a construction, and at least a portion of the partition comprises the surface area;
the $T_A$ is on the outside of the construction;
the $T_B$ is on the inside of the construction;
in a first mode, normal temperature values are temperature values above the $T_{ISO}$ and abnormal temperature values are temperature values below the $T_{ISO}$ and, in a second mode, normal temperature values are temperature values below the $T_{Iso}$ and abnormal temperature values are temperature values above the $T_{ISO}$; and
the adjusting comprises:
determining, based on the comparison, whether the temperature of the at least one image point is normal or abnormal; and
adjusting the color of the at least one image point in dependence of whether the temperature of the image point is normal or abnormal.

3. The method of claim 2, comprising:
calculating thermal transmission coefficients of the partition based, at least in part, on the registered $T_A$ and the registered $T_B$; and
superimposing the thermal transmission coefficients onto the displayed colored version of the thermal image and/or storing the thermal transmission coefficients in connection with the thermal image.

4. The method of claim 1, comprising:
registering a distance between the IR thermal camera and the surface area as the IR thermal camera captures the thermal image;
retrieving the field of view (FOV) of the IR thermal camera;
calculating to scale information related to the thermal image based on the retrieved FOV and the registered distance information, wherein the calculated to scale information is superimposed onto the colored version of the thermal image and/or stored in connection with the thermal image.

5. The method of claim 4, wherein the calculated to scale information is related to the length, size, and/or area of at least a part of the surface area.

6. The method of claim 1, comprising determining a direction from the IR thermal camera to the surface area and/or the imaged scene.

7. The method of claim 6,
wherein the direction information is determined using a compass device, the method comprising:
registering a distance between the IR thermal camera and the surface area as the IR thermal camera captures the thermal image;
determining additional information relating to characteristics of any image points having an abnormal temperature, based, at least in part, on the determined direction and/or the registered distance information, wherein the adjusting the color of the at least one image point depends, at least in part, on any determined additional information; and compensating for the determined direction when calculating the $T_{ISO}$.

8. The method of claim 1, comprising:

registering the air humidity level; and compensating for the registered air humidity level when registering the $T_A$, registering the $T_B$, calculating the $T_{ISO}$, adjusting the color of the at least one image point, and/or displaying the colored version of the thermal image.

9. The method of claim 1, comprising:

registering a distance between the IR camera and the surface area as the IR camera captures the thermal image;

determining additional information relating to characteristics of any image points having an abnormal temperature; and compensating for the registered distance and any determined additional information when adjusting the color of the at least one image point and/or displaying the colored version of the thermal image.

10. An infrared (IR) thermal camera comprising:

a lens configured to focus incoming IR radiation from an object for the IR camera to capture a thermal image corresponding to the incoming IR radiation;

a processor configured to calculate, on the basis of at least a first registered air temperature value ($T_A$), a second registered air temperature value ($T_B$), and a temperature color alarm level ($T_{CAL}$), a threshold temperature level value ($T_{ISO}$); and a color adjusting unit, which in dependence of temperature values registered via one or more temperature input devices and processed by the processor, is configured to display the thermal image via a display;

wherein the color adjusting unit is configured to compare a surface area temperature in at least one image point of the thermal image to the $T_{ISO}$ and adjust the color in the at least one image point in dependence of the comparison to create a colored version of the thermal image.

11. The IR thermal camera of claim 10, comprising a distance measuring device configured to register the distance between the IR thermal camera and the object as the IR thermal camera captures the thermal image, wherein:

the object represents a portion of a structure;

the $T_A$ corresponds to an outside temperature of the structure;

the $T_B$ corresponds to an inside temperature of the structure;

the processor is configured to receive the registered distance information and determine additional information relating to the characteristics of any defects or abnormalities present on a surface area of the object and/or structure, dependent on the registered distance information; and the color adjusting unit is configured to adjust the color in the at least one image point in dependence of any determined additional information.

12. The IR thermal camera of claim 10, wherein the processor is configured to:

retrieve a field of view (FOV) of the IR thermal camera;

calculate to scale information related to the thermal image, based on the retrieved FOV and the registered distance information; and superimpose the calculated to scale information onto the colored version of the thermal image.

13. The IR thermal camera of claim 12, wherein the calculated to scale information is related to the length, size, and/or area of at least a part of the surface area.

14. The IR thermal camera of claim 12, comprising a storage unit configured to store the calculated to scale information in connection with the thermal image.

15. The IR thermal camera of claim 10, comprising a direction determination unit configured to determine the direction from the IR thermal camera to the surface area, the object, and/or a corresponding imaged scene.

16. The IR thermal camera of claim 15, wherein:

the direction determination unit comprises a compass device; and the processor is configured to compensate for the determined direction when calculating the $T_{ISO}$ and/or determining any additional information.

17. The IR thermal camera of claim 10, wherein the processor is configured to calculate thermal transmission coefficients of the object based, at least in part, on the $T_A$ and the $T_B$.

18. The IR thermal camera of claim 10, comprising a humidity input device for receiving at least one atmospheric humidity value, wherein the processor is configured to compensate for the atmospheric humidity value when calculating the $T_{ISO}$.

19. The IR thermal camera of claim 10, comprising a distance measuring device configured to register the distance between the IR thermal camera and the object as the IR thermal camera captures the thermal image, wherein the processor is configured to compensate for the registered distance information when calculating the $T_{ISO}$.

20. An infrared (IR) thermal camera comprising:

a focusing means for focusing incoming IR radiation from an object, representing a portion of a structure, for the IR camera to generate a thermal image signal corresponding to the incoming IR radiation;

a signal conditioning unit for receiving the thermal image signal and conditioning the thermal image signal; and a color adjusting means for receiving the conditioned thermal image signal and for displaying a colored thermal image via a display in dependence of temperature values registered via a temperature input means and a temperature calculation means, wherein:

the calculation means is configured to calculate, on the basis of at least a first registered air temperature value ($T_A$), a second registered air temperature value ($T_B$), and a temperature color alarm level ($T_{CAL}$), a threshold temperature level value ($T_{ISO}$); and the color adjusting means is configured to compare a surface area temperature in at least one image point of the thermal image to the $T_{ISO}$ and adjust the color in the at least one image point in dependence of the comparison to create the colored thermal image.

* * * * *